Figure 1:
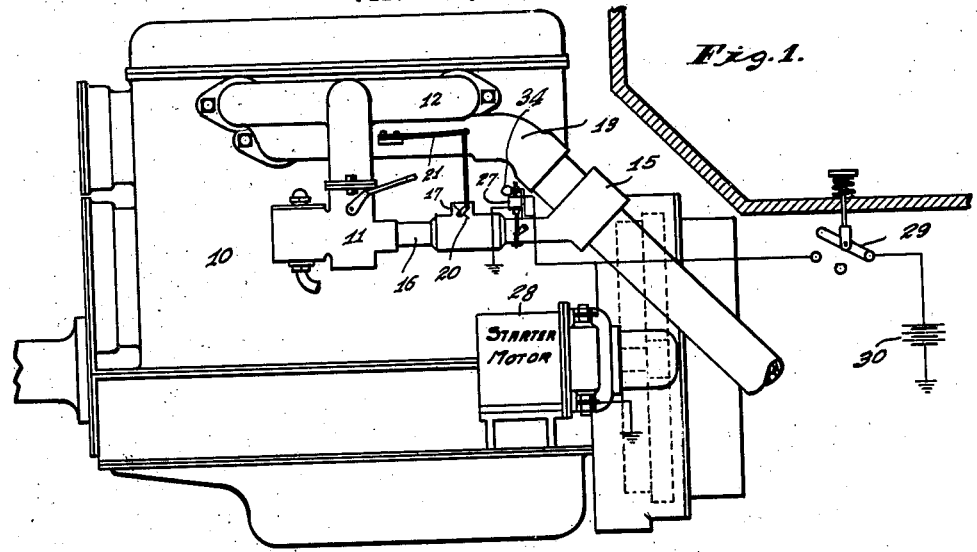

March 23, 1926.

G. R. SISSON

AUTOMATIC CHOKER FOR CARBURETORS

Filed July 16, 1923

1,577,766

2 Sheets-Sheet 1

INVENTOR.
GLEN R. SISSON,
BY
ATTORNEY.

March 23, 1926.  1,577,766
G. R. SISSON
AUTOMATIC CHOKER FOR CARBURETORS
Filed July 16, 1923   2 Sheets-Sheet 2
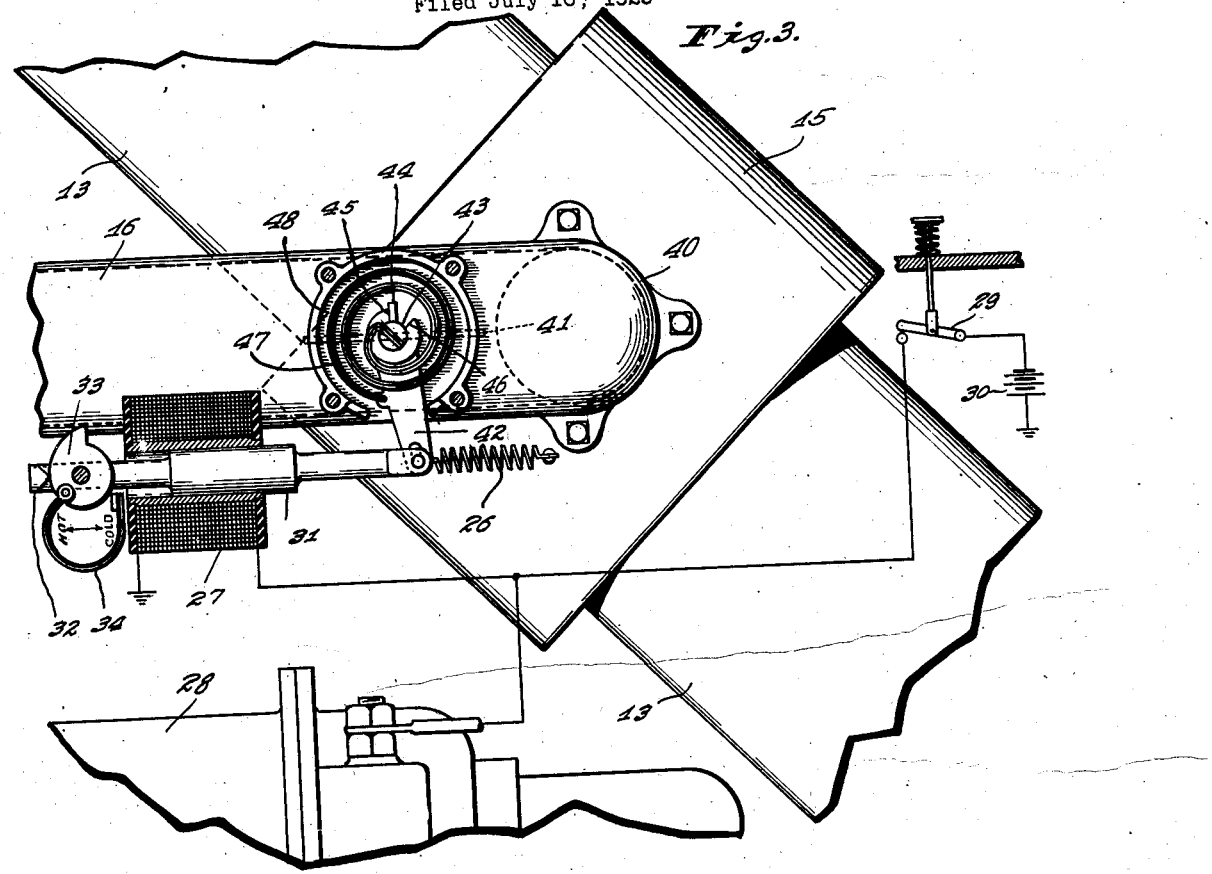
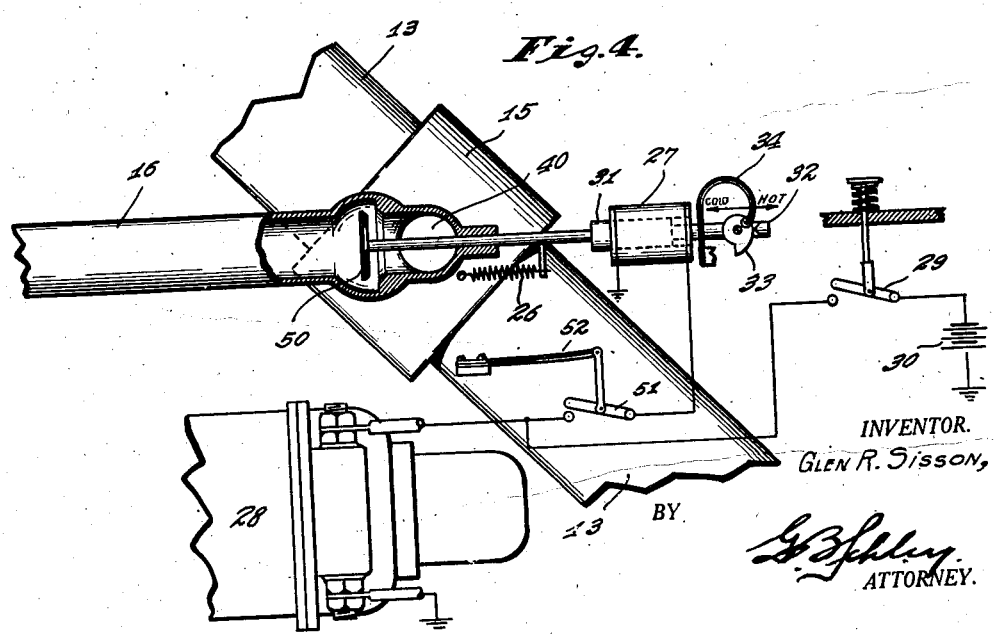
INVENTOR.
GLEN R. SISSON,
BY
ATTORNEY.

Patented Mar. 23, 1926.

1,577,766

UNITED STATES PATENT OFFICE.

GLEN R. SISSON, OF PENDLETON, INDIANA.

AUTOMATIC CHOKER FOR CARBURETORS.

Application filed July 16, 1923. Serial No. 651,871.

*To all whom it may concern:*

Be it known that I, GLEN R. SISSON, a citizen of the United States, residing at Pendleton, in the county of Madison and State of Indiana, have invented a new and useful Automatic Choker for Carburetors, of which the following is a specification.

It is the object of my invention to provide an automatic choker for carburetors, for regulating the air-supply, especially during starting and warming up, and for compensation for temperature variations both in the air and in the engine, so that an efficient mixture under all conditions may be obtained without requiring special skill on the part of the operator.

In the operation of automobiles, many drivers have difficulty, especially in and just after starting, and most pronouncedly in cold weather, in getting the right amount of air. They may fail to start by having too much air. They may fail to start by having too little air. They may kill their engines immediately after starting, by opening the choker valve too wide and thus admitting too much air, especially in cold weather and with a cold engine. Even if they do succeed in getting the engine started and keeping it running, they are apt very quickly to have inefficient operation by reason of too little air, on account of keeping the choker too far closed too long after starting.

In accordance with my invention, I control a supply of air for the carburetor jointly by three conditions: the temperature of the engine, the temperature of the air, and the condition of the circuit of the starter motor for the engine; but my invention in some of its aspects requires control by only two of these conditions. I provide a choker valve which is automatically actuated to cut down the air-supply for the carburetor while the circuit of the starter motor is closed, and to increase such supply when the starter-motor circuit is opened. I impose upon this control of the air-supply to the carburetor by the starter-motor circuit, a second control by changes in the temperature of the engine; by increasing such air-supply as the engine warms up and decreasing it as the engine cools down. This control by temperature, or more specifically engine temperature, and starter-motor circuit jointly is broadly the subject of my co-pending application, Serial No. 634,576, filed April 25, 1923, in which application the two controlling actions are shown as exerted through separate valves in the branches of a branched air inlet. According to my present invention—when considered independently of the third control feature to be referred to later, as some of the claims do consider it—the control by engine temperature and starter-motor circuit jointly is obtained through joint control of the same choker valve; but in those claims where the third feature of control by temperature of the air is involved in its broader aspect, my present invention contemplates broadly the joint control by the air temperature and by either or both of the starter-motor circuit and the engine temperature, whether this joint control is by a single choker valve or by more than one choker valve. This third feature of control is by a device which is responsive to temperature of the air, and which, specifically considered, acts to limit the extent to which a choker valve is opened upon the interruption of the starter-motor circuit, so that when the air is cold such choker valve will not be opened as wide upon the breaking of the starter-motor circuit as when the air is warm, other conditions remaining the same.

Figure 2:
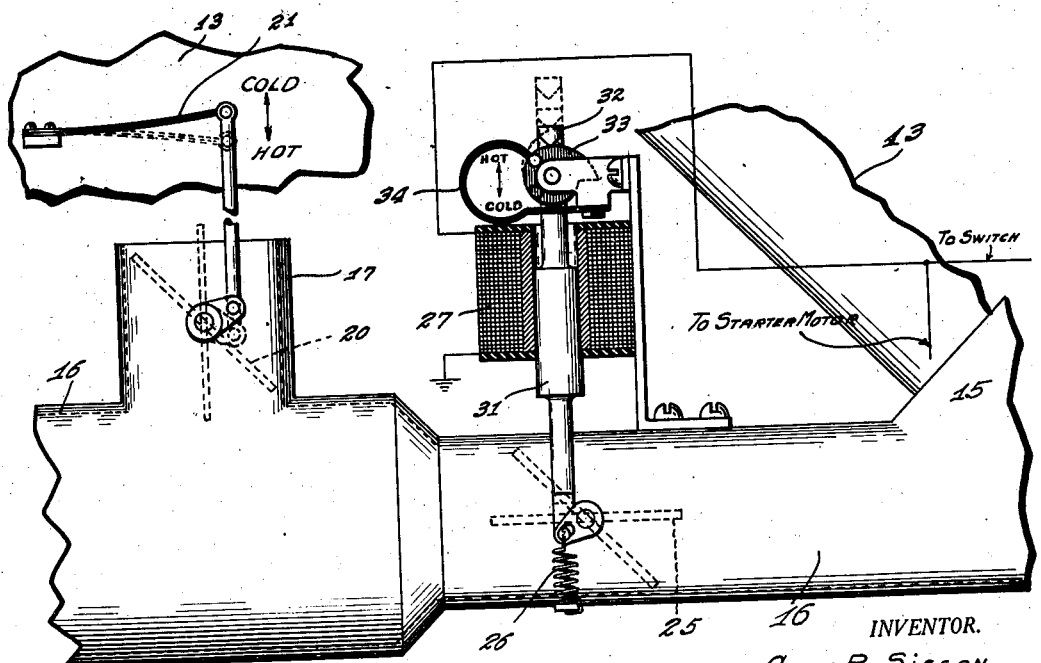

The accompanying drawings illustrate my invention: Fig. 1 is a side elevation of an automobile engine equipped with one form of my invention, with two choker valves, the structure being shown semi-diagrammatically; Fig. 2 is an enlarged sectional detail of the air-control apparatus of Fig. 1; Fig. 3 is a fragmental side elevation of a different air-control arrangement, wherein a single choker valve is jointly governed by all three controls; and Fig. 4 is another fragmental side elevation of a still different air-control arrangement, wherein a rise of the temperature of the engine is used to render inoperative the control of the choker valve by the starter-motor circuit.

The engine 10 is supplied with explosive mixture by the usual carburetor 11, which supplies such explosive mixture to the engine through any convenient intake manifold 12; and the exhaust gases from the engine are discharged through an exhaust manifold 13 in the usual way. At least part of the air-supply for the carburetor 11 is conveniently derived from the usual stove 15 on the exhaust manifold 13, so that the air will be heated by the heat of the exhaust gases, though this stove is not essential to my invention. The air-supply pipe 16 for the carburetor leads from this stove 15, when and if it is provided, to the air-inlet opening of the carburetor, with an intermediate valve-controlled branch-inlet opening 17 in the form of my invention shown in Figs. 1 and 2, but without any such intermediate valve-controlled branch-inlet opening in the embodiment of my invention illustrated in Figs. 3 and 4.

Referring first to the arrangement shown in Figs. 1 and 2: In the valve-controlled branch-inlet 17 is a choker valve 20, which is operated by a thermostat 21 mounted on the exhaust manifold 13 or otherwise responsive to the temperature of the engine. This thermostat 21 is shown as the usual two-metal strip, arranged so that its free end falls and rises as the temperature of the engine increases and decreases respectively, so that the choker valve 20 will be opened upon increase in engine temperature and closing upon decrease in engine temperature. The branch-inlet opening 17, which is controlled by the choker valve 20, is shown as getting its air independently of any stove, though this independence is not essential.

In the main air-supply pipe 16, between the stove 15 and the branch-inlet opening 17, there is a choker valve 25, which is spring-pressed toward open position, as by a tension spring 26, and which may be closed by a solenoid 27. The solenoid 27 is connected in shunt to the starter motor 28, so that it is controlled jointly therewith by the usual starter switch 29. When the starter switch 29 is depressed, it completes a circuit from the usual battery 30 to the starter motor 28, and to the solenoid 27 in shunt to such starter motor. Thus the solenoid 27 closes the choker valve 25 during the time the starter motor 28 is in operation, and the spring 26 opens such choker valve during the time the starter motor is not in operation.

The extent to which the spring 26 opens the choker valve 25, however, varies with the temperature of the air. When the air is cold, the choker valve 25 is not permitted to open as far as when the air is hot. To get this control, I provide the core 31 of the solenoid with a transverse stop finger 32, which co-operates with a cam-stop 33 rotated by a thermostat 34 responsive to the air temperature. The thermostat 34 is also shown as a two-metal strip, and is arranged so that its end which is connected to the cam-stop 33 rises and falls as the air temperature rises and falls respectively. This turns the cam-stop 33 in a clockwise direction when the air temperature rises, toward or to the limiting position shown in full lines in Fig. 2, so that then the choker valve 25 may be open to the utmost when the solenoid 27 is de-energized; and turns such cam-stop 33 in a counter-clockwise direction when the air temperature falls, toward or to the position shown in dotted lines in Fig. 2, so that then the choker valve 25 will not be opened so far when the solenoid 27 is de-energized. The stop finger 32 is shown in Fig. 2 in full lines for the wide-open position of the choker valve 25, and in two dotted-line positions for the closed and the partly opened conditions of the choker valve respectively.

In the operation of the arrangement shown in Figs. 1 and 2, the engine is started in the usual manner, by closing the starter switch 29 to cause the starter motor 28 to turn the engine over. The operator, however, pays no attention to any choker-valve adjustments for obtaining his starting. The closing of the starter switch 29 produces the energization of the solenoid 27, which acts to close the choker valve 25 and thus to cut down the supply of air to the carburetor. If the engine is cold, the other choker valve 20 will then be in closed position; so that the closing of the choker valve 25 by the solenoid makes the very rich mixture required for cold starting. If the engine is not so cold, the choker valve 20 will be proportionately open, and may be wide open if the engine has only very recently stopped. As soon as the engine starts, which it will do very promptly, the starter switch 29 is opened, to de-energize both the starter motor 28 and the solenoid 27. The core 31 drops, to cause the choker valve 25 to open as far as permitted by the cam-stop 33. If the air is hot, this permits a wide opening of the choker valve 25; because the cam-stop 33 will be in or well toward its "hot" position shown in full lines. If on the other hand the air is cold, this permits a much less wide opening of the choker valve 25; because the thermostat 34 will then have moved the cam-stop 33 toward or to its "cold" position shown in dotted lines in Fig. 2. This makes both for efficient starting and for efficient operation after starting, without danger of killing the engine from having a mixture which is either too rich or too lean. If the engine was cold at starting, so that the choker valve 20 was in closed or nearly closed position, the thermostat 21 acts to open such choker valve 20 as the engine warms up, until such choker valve 20 is in wide-open position for a hot engine. Thus the operation of the starting motor always cuts down the supply of air during such starting, but such air supply is also controlled partly by the temperature of the engine and partly by the temperature of the air.

Referring now to the embodiment of my invention illustrated in Fig. 3: The exhaust manifold 13, the stove 15, the solenoid 27 and its core 31, the starter switch 29, the starter motor 28, the stop figure 32, the cam-stop 33, and the thermostat 34 are the same as shown in Figs. 1 and 2, save that the solenoid with its associated parts is shown laid on its side; but, as before, the thermostat 34 is so shown that the cam-stop 33 is moved in a clockwise direction upon increase in air temperature and in a counter-clockwise direction upon decrease in air temperature. Here, however, the air-supply pipe 16 is shown as having only a single air-inlet 40, through the stove 15, so that the air flow into such air-supply pipe is controlled by a single choker valve 41. The core 31 is connected to an arm 42; which is mounted on the shaft 43 of this choker valve 41, and is free to swing thereon between certain limiting positions determined by a pin 44 projecting outward from the shaft and working between two limiting stop-shoulders 45 and 46 on the arm 42. The arm 42 and shaft 43 are connected by a spiral thermostat 47, which is formed of a two-metal strip, and which tends to uncoil on being heated and to coil on itself on being cooled. In consequence, for a given position of the arm 42, the choker valve 41 tends to move in a counter-clockwise direction, to shift the pin 44 toward or to the stop shoulder 45, upon increase in temperature; and tends to move in a clockwise direction, to shift the pin 44 toward or to the stop shoulder 46, upon decrease in temperature. The thermostat 47 is responsive to variations in temperature of the engine; as shown being mounted in a pocket 48 on the side of the air-supply pipe 16, close to the stove 15, so that it will receive heat by rather short-path metallic conduction from the exhaust manifold 13 which passes through such stove 15.

In the arrangement shown in Fig. 3, as in the arrangement shown in Figs. 1 and 2, the choking of the air supply for the carburetor is controlled jointly by the starter-motor circuit, the engine temperature, and the air temperature. When the starter switch 29 is closed, the solenoid 27 pulls its core to the left, to swing the choker valve 41 in a clockwise direction toward closed position. When the starter switch 29 is released to break the starter motor, the solenoid 27 permits the spring 26 to move the core 31 to the right, to swing the choker valve 41 in a counter-clockwise direction toward wide-open position. The extent to which the core 31 thus moves to the right is controlled by the air temperature, acting on the thermostat 34 to control the position of the cam-stop 33 to make such movement of the core toward the right less when the air is cold than when the air is hot; so that the hotter the air is, the farther the choker valve 41 will be swung toward its wide-open position. The actual position the choker valve 41 takes in any of these various conditions, however, depends upon the engine temperature. If the engine is cold, the whole range of movement of the choker valve 41, under the action of the solenoid 27 and spring 26 and the limiting effect of the cam-stop 33, will be further in a clockwise direction than when the engine is hot; so that other things remaining constant, the choker valve 41 is swung to the left toward or to wide-open position as the engine heats up. If the engine is cold on starting, the action of the solenoid 27 when it is energized will be to move the choker valve 41 substantially to closed position; and the choker valve 41 will move only part way toward open position when the solenoid 27 is de-energized. On the other hand, if the engine is hot on starting, as from having been stopped only a short time, the action of the solenoid 27 when it is energized is to move the choker valve 41 only part way toward closed position, but to let it open wider when the solenoid is de-energized.

Now referring to the embodiment of my invention illustrated in Fig. 4: The exhaust manifold 13, the stove 15, the solenoid 27 and its core 31, the starter switch 29, the starter motor 28, the stop finger 32, the cam-stop 33, and the thermostat 34 are the same as shown in Figs. 1, 2, and 3, and the solenoid and its associated parts is laid on its side but in the reverse direction from that illustrated in Fig. 3; but the thermostat 34 is shown arranged, as before, so that the cam-stop 33 is moved in a clockwise direction upon increase in air temperature and in a counter-clockwise direction upon decrease in air temperature to control the extent of opening of the choker valve by such air temperature. Here, as in the case of the arrangement shown in Fig. 3, the air-supply pipe 16 is shown as having only a single air inlet 40, through the stove 15, so that the air flow through such air supply pipe is controlled by a single choker valve 50. This choker valve 50 is illustrated in Fig. 4 as of the poppet type, whereas the other choker valves have all been of the butterfly type; but this is merely to show that my invention is applicable to any type of choker valve, and is not limited to any particular type in any embodiment of my invention. The solenoid 27 is connected, as before, in shunt to the starter motor 28, so that it is controlled jointly therewith by the starter switch 29. In the shunt connection leading to the solenoid 27, however, there is a second switch 51, which is operably connected to a thermostat 52 responsive to the temperature of the engine, as by being mounted on the exhaust manifold 13. This thermostat 52, like the others, is shown as a two-metal strip; and it is arranged so that when the engine exceeds a predetermined temperature, the switch-connected end of such thermostat rises to open the switch 51, in which position it is shown. In consequence, the solenoid 27 is energized under the control of the starter switch 29 only when the engine temperature is below a predetermined point, or sufficiently low so that the solenoid 52 will close the switch 51; so that when the engine is hot and in condition for easy starting the operation of the starter motor 28 will not be accompanied by a choking of the air supply.

Thus in the arrangement shown in Fig. 4, the choking of the air supply is controlled by the condition of the starter-motor circuit, with a super-control by the temperature of the engine, and the extent to which the choker valve opens is controlled by the temperature of the air.

I claim as my invention:

1. A choking device for the carburetor of an internal combustion engine, comprising a choker valve for controlling air-flow to said carburetor, electro-magnetic operating means for said choker valve, and thermostatic means for controlling said choker valve jointly with said electro-magnetic operating means.

2. A choking device for the carburetor of an internal combustion engine, comprising a choker valve, electro-magnetic operating means for said choker valve, and a thermostat for limiting the opening movement of said choker valve upon the deenergization of said electro-magnetic operating means.

3. The combination set forth in claim 2, with the addition that the thermostat is responsive to the temperature of the air.

4. A choking device for the carburetor of an internal combustion engine, comprising a choker valve for controlling air-flow to said carburetor, electro-magnetic operating means for said choker valve, and two thermostats responsive respectively to air temperature and engine temperature and controlling said choker valve jointly with said electro-magnetic operating means.

5. A choking device for the carburetor of an internal combustion engine having a starter device, comprising a choker valve, means controlled jointly with said starter device for moving said choker valve toward closed position while the starter device is operating and for permitting it to move toward open position when the starter device ceases operating, and a thermostat arranged to control the extent to which the choker valve moves toward open position upon the stopping of the operation of said starter device.

6. A choking device for the carburetor of an internal combustion engine having a starter device, comprising a choker valve, means controlled jointly with said starter device for moving said choker valve toward closed position while the starter device is operating and for permitting it to move toward open position when the starter device ceases operating, and a thermostat responsive to the temperature of the air and arranged to control the extent to which the choker valve moves toward open position upon the stopping of the operation of said starter device.

7. The combination set forth in claim 6, with the addition of a thermostat responsive to the temperature of the engine and exerting a control on said choker valve jointly with the other controlling devices thereof.

8. A choking device for the carburetor of an internal combustion engine having a starter device, comprising means for choking the supply of air to the carburetor, means rendered operative during the starting of the engine by said starting device for increasing the choking effect of said choking means, and means for varying the choking of the supply of air to the carburetor in accordance with the temperature of the air.

9. A choking device for the carburetor of an internal combustion engine having a starter device, comprising means for choking the supply of air to the carburetor, means rendered operative during the starting of the engine by said starting device for increasing the choking effect of said choking means, and means for varying the choking of the supply of air to the carburetor in accordance with the temperature of the air and also in accordance with the temperature of the engine.

10. A choking device for the carburetor of an internal combustion engine having a starter device, comprising a single choker valve for choking the supply of air to the carburetor, means rendered operative during the starting of the engine by said starting device for increasing the choking effect of said choker valve, and two thermostats responsive respectively to the temperature of the air and to the temperature of the engine for controlling said choker valve jointly with the aforesaid means.

11. A choking device for the carburetor of an internal combustion engine having an electric starter motor and its control switch, comprising a choker valve, electro-magnetic means also controlled by said control switch and rendered operative during the energization of the starter motor for moving said choker valve toward closed position, and a thermostat also exerting a control on said choker valve.

12. A choking device for the carburetor of an internal combustion engine having an electric starter motor and its control switch, comprising a choker valve, electro-magnetic means also controlled by said control switch and rendered operative during the energization of the starter motor for moving said choker valve toward closed position, and a thermostat also exerting a control on said choker valve, said thermostat being responsive to the temperature of the air.

13. The combination set forth in claim 11, with the addition that said thermostat is responsive to the temperature of the engine.

14. The combination set forth in claim 12, with the addition of a second thermostat responsive to the temperature of the engine and also exerting a control on said choker valve.

15. A choking device for the carburetor of an internal combustion engine, comprising means for controlling the air inlet to the carburetor, and means for governing said controlling means jointly by the temperature of the air and the temperature of the engine.

16. The combination set forth in claim 1, with the addition that said thermostatic means is responsive to the temperature of the air.

17. The combination set forth in claim 1, with the addition that said thermostatic means is responsive to the temperature of the engine.

18. A choking device for the carburetor of an internal combustion engine, comprising a choker valve, electro-magnetic operating means for said choker valve, and two thermostatic means for controlling said choker valve jointly with said electro-magnetic operating means, one of said thermostatic means being responsive to air temperature and the other to engine temperature.

19. A choking device for the carburetor of an internal combustion engine having a starter device, comprising a choker valve, means controlled jointly with said starter device for moving said choker valve toward closed position while the starter device is operated and for permitting it to move toward open position when the starter device ceases operating, and thermostatic means also exerting a control on said choker valve.

20. The combination set forth in claim 19, with the addition that said thermostatic means is responsive to the temperature of the air.

21. The combination set forth in claim 19 with the addition that said thermostatic means is responsive to the temperature of the engine.

22. A choking device for the carburetor of an internal combustion engine having a starter device, comprising a choker valve, means controlled jointly with said starter device for moving said choker valve toward closed position while the starter device is operated and for permitting it to move toward open position when the starter device ceases operating, and two thermostatic means also exerting a control on said choker valve, one of said thermostatic means being responsive to air temperature and the other to engine temperature.

In witness whereof, I have hereunto set my hand at Indianapolis, Indiana, this 12th day of July, A. D. one thousand nine hundred and twenty-three.

GLEN R. SISSON.